US009395891B2

United States Patent
Timsjo et al.

(10) Patent No.: US 9,395,891 B2
(45) Date of Patent: Jul. 19, 2016

(54) METHOD FOR PROVIDING A NAVIGATION TOOL OF A USER INTERFACE FOR AN INDUSTRIAL CONTROL SYSTEM

(71) Applicant: ABB Research Ltd., Zurich (CH)

(72) Inventors: Susanne Timsjo, Vasteras (SE); Saad Azhar, Vasteras (SE); Nils Johansson, Vasteras (SE)

(73) Assignee: ABB Research Ltd., Zurich (CH)

( * ) Notice: Subject to any disclaimer, the term of this patent is extended or adjusted under 35 U.S.C. 154(b) by 49 days.

(21) Appl. No.: 14/466,466

(22) Filed: Aug. 22, 2014

(65) Prior Publication Data

US 2014/0364969 A1    Dec. 11, 2014

Related U.S. Application Data

(63) Continuation of application No. PCT/EP2012/053087, filed on Feb. 23, 2012.

(51) Int. Cl.
*G06F 3/0484*    (2013.01)
*G05B 23/02*    (2006.01)
*G05B 15/02*    (2006.01)

(52) U.S. Cl.
CPC ............ *G06F 3/04842* (2013.01); *G05B 15/02* (2013.01); *G05B 23/0272* (2013.01); *G05B 2219/31455* (2013.01); *G05B 2219/31471* (2013.01); *G05B 2219/31472* (2013.01); *G05B 2219/31474* (2013.01); *G05B 2219/31478* (2013.01)

(58) Field of Classification Search
CPC .................................................... G06F 3/0484
USPC ........................................... 700/83; 345/629
See application file for complete search history.

(56) References Cited

U.S. PATENT DOCUMENTS 7,634,384 B2    12/2009    Eryurek et al.
7,817,168 B2    10/2010    Nagiyama et al.
(Continued)

FOREIGN PATENT DOCUMENTS

EP    2343642 A1    12/2009
WO    9909532 A2    2/1999
(Continued)

OTHER PUBLICATIONS

International Search Report and Written Opinion of the International Searching Authority Application No. PCT/EP2012/053087 Completed: Oct. 26, 2012; Mailing Date: Nov. 29, 2012 12 pages.

*Primary Examiner* — Tejal Gami
(74) *Attorney, Agent, or Firm* — Whitmyer IP Group LLC

(57) ABSTRACT

A method for providing a navigation tool of a user interface for an industrial control system. The control system is arranged with a plurality of process graphics including one or more software objects. The software objects are arranged in hierarchical groups each representing a process, part-process or an equipment, in which materials are moved and/or processed in a predetermined order. The navigation tool includes a graphic image or map showing the plurality of process graphics symbolically arranged as a plurality of nodes. Each node is spatially arranged at a given distance from the centre of the map according to a hierarchical relationship between the process graphics, and the map is displayed superimposed on top of the process graphic currently displayed on the workstation. A computer program and a workstation are also described. The node representing the currently open process graphic is shown by a visual indicator.

16 Claims, 4 Drawing Sheets

(56) References Cited

U.S. PATENT DOCUMENTS

| | | |
|---|---|---|
| 2011/0126144 A1 | 5/2011 | Sakaguchi et al. |
| 2011/0219324 A1 | 9/2011 | Watanabe et al. |
| 2011/0230980 A1 | 9/2011 | Hammack et al. |

FOREIGN PATENT DOCUMENTS

| | | |
|---|---|---|
| WO | 2005109122 A1 | 11/2005 |
| WO | 2011025293 A2 | 3/2011 |

METHOD FOR PROVIDING A NAVIGATION TOOL OF A USER INTERFACE FOR AN INDUSTRIAL CONTROL SYSTEM

FIELD OF THE INVENTION

The present invention is concerned with providing an improved operations interface and navigation tool in a human-machine interface (HMI) in an industrial control system or process control system. In particular it is concerned with a method and system for providing a navigation tool of a graphical user interface or HMI in a process control system or an industrial control system for monitoring and control of a process.

BACKGROUND OF THE INVENTION

Computer based control systems are widely used in a number of different industrial environments, such as for instance a pulp and paper process, a steel rolling mill, a process in an oil and gas production installation or in a refinery, and in an installation for producing, generating or distributing electrical power. Such process control systems gather and contain information about plant equipment, current and historic process data, trends, etc to carry out supervision and control of processes, industrial plants and production facilities. This information is typically provided by the control system and usually in the form of one or more distributed control systems (DCS) and/or supervisory control and data acquisition (SCADA) systems.

The process control information is typically presented to the operators by a display screen showing a number of different process graphics that each presents process data (measurements, values), tag identifiers, equipment ID, alarm status, connections between plant equipment, etc for a given process or process section. As more and more data is presented to the operators, the number of process graphic in a process control system increases and visual user interfaces often hold a great deal of information. WO2005/109122 entitled Graphic element with multiple visualizations in a process environment, and assigned to Fisher Rosemount Systems Inc., describes a system in which smart graphic elements are provided for use as portions or components of one or more graphic displays. According to the Abstract, the smart graphic elements may be executed in a process plant to display information to users about the process plant environment, such as the current state of devices within the process plant. Each of the graphic elements is an executable object that includes a property or a variable that may be bound to an associated process entity, like a field device, and that includes multiple visualizations, each of which may be used to graphically depict the associated process entity on a user interface when the graphic element is executed as part of the graphic display. Any of the graphic element visualizations may be used in any particular graphic display and the same graphic display may use different ones of the visualizations at different times.

The work of an operator supervising a process includes the important functions of supervising the various parts of a process, and taking control actions when necessary. The main functions used by the operators are typically alarm management, trends and process graphics. An important functionality in the control system is navigation and another important aspect of that is visualization of system status and to highlight data that has provoked an abnormal condition. However, along with increased access to information, the task of finding the relevant technical information for a given technical subject or condition in a large information space is further complicated by the fact that in some situations the operator often has limited time available to make a decision. The significance of the information available will vary with the current situation. That is, users of industrial control systems have to deal at least in part with a problem of what is relevant in a given context, context sensitivity, as in some contexts certain information will be essential and in other contexts irrelevant.

Operators often find it difficult to navigate from one process graphic to another in order to find the information they seek. New operators spend great amounts of time getting to know the process graphics, to learn which information is located where and especially how to move from viewing an equipment or process in one process graphic to find and view a relevant equipment or process monitored and controlled by another process graphic. Furthermore, viewing several process graphics at the same time is technically possible today, but is difficult to use in practice. The most used solution for this is to have several monitors/windows and navigate each of these independently. It is common to find several display screens arranged on an operator desk, so that the operator has several views/displays open in front of him/her in order be able to view or find the desired information quickly.

However, even when using multiple screens, there is often no sense of context. When operators are looking at a display of one particular process graphic, it is often not possible to know where in the hierarchy of process displays the user currently is, and to which other process graphics they should go to in order to follow up on information or an event in the current process graphic on the current display. The inventors have identified that there is a need for a way to quickly navigate from one process graphic display to another in a logical manner while still keeping an overview of the process in sight.

SUMMARY OF THE INVENTION

According to a first aspect of the present invention an improvement is provided in the form of a method for providing a navigation tool of a user interface for an industrial control system comprising a computer and a display device or workstation, the system further arranged with a plurality of process graphics comprising one or more software objects for controlling and/or monitoring real world objects in a process controlled by said control system, which said software objects are arranged in a plurality of hierarchical groups each one representing a process, part-process or an equipment in which materials are moved and/or processed in a predetermined order from one process state to another, which process or equipment is displayed in one of a plurality of said process graphics on a workstation, the method comprising automatically generating a graphic image in the form of a map showing the plurality of process graphics arranged symbolically as a plurality of nodes, where each node is spatially arranged in a separate part of the map according to a hierarchical relationship between the process graphics, and superimposing the graphic image of the map on top of a said process graphic displayed on the workstation. By means using the map as a visual navigation tool, the graphical representation of the hierarchical relationship between different process graphics enables the operator to identify different parts and related parts of the process which facilitates finding the process graphic containing information of interest.

According to another embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a separate part of the map according to a hierarchical relationship between the process graphics, and the one node of the plurality of nodes on the map that represents the said process graphic that is currently displayed is automatically indicated with a visual indicator arranged on the node. By this means it is immediately apparent to the operator which process graphic he or she is looking at, and where this process graphic is in a hierarchical relationship between process graphics, and thus which process section in the overall process the current process graphic is displaying, without having to open another, further window or to move his or her attention away from the currently open process graphic to find out this information about context. Thus identifying different parts and related parts of the process is facilitated making it easier for the operator to find the process graphic containing information of interest.

According to another embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a graphically separate part of the map according to a hierarchical relationship between the process graphics, and where by activation of a node in the map an executable function associated with the node then opens the process graphic represented by the node so activated and displays it on the user interface or in a window on the interface. Thus navigation from a first process graphic to a second process graphic of interest may be carried out by activating a node on the map superimposed on the first process graphic. Thus the operator does not divert his or her attention away from the process graphic currently open because the map is already visible, and also the mapping of hierarchical relations between process graphics represented by the nodes is also visible all the time, making it easier for the operator to have and maintain a sense of context in the process.

According to yet another embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a separate part of the map according to a hierarchical relationship between the process graphics, where by activation of a node in the map by means of an executable function associated with the node, the process graphic represented by the node so activated is opened, and the map is re-drawn such that the node representing the presently open process graphic is shown with a different visual appearance from the remainder of the plurality of nodes to indicate on the map that it is the node that represents the said process graphic that is currently displayed.

According to another, further embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a separate part of the map according to a hierarchical relationship between the process graphics, and whereby each node on the map is arranged corresponding according to a position of the process graphic it represents in the hierarchical relationship between two or more processes, part-processes or equipment represented on a process graphic.

According to further embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a separate part of the map according to a hierarchical relationship between the process graphics, and by arranging each node on the map at one of a plurality of finite distances from the centre of the map according to a position in the hierarchical relationship between the two or more said process graphics.

According to another and preferred embodiment of the invention, a method for providing a navigation tool of a user interface for an industrial control system is disclosed comprising automatically generating a graphic image in the form of a map showing the plurality of process graphics arranged symbolically as a plurality of nodes, where each node is spatially arranged in a separate part of the map according to a hierarchical relationship between the process graphics, and where by automatically retrieving one or more states from a process graphic a node is arranged with a predetermined visual indicator representing it on the map to show or indicate, in a static or dynamic way, the one or more states in the process graphic which is or are equal to any from the group of: normal, alarm, high priority alarm, alarm acknowledged and not cancelled, alarm within a predetermined time period.

According to a second aspect of the invention, a workstation for a control system is provided, the industrial control system comprising a computer and a display device, said workstation being arranged with a user interface, said system further arranged with a plurality of process graphics comprising one or more software objects for controlling and/or monitoring real world objects in a process controlled by said control system, which said software objects are arranged in a plurality of hierarchical groups each one representing a process, part-process or an equipment in which materials are moved and/or processed in a predetermined order from one process state to another, which process or equipment is displayed in one of a plurality of said process graphics on a workstation, the workstation further comprising: an interface for receiving measurement data of one or more physical properties relating to a process being controlled by the process control system, a display unit for displaying physical properties of the process control system to a system operator, and a display control unit configured to display a graphic image in the form of a map showing the plurality of process graphics arranged symbolically as a plurality of nodes, where each node is spatially arranged in a separate part of the map according to a hierarchical relationship between the process graphics, and where the graphic image of the map is superimposed on top of a said process graphic displayed on the workstation.

A primary aim of the present invention is to provide a navigation tool that provides a layout that contains visual information about the 'process flow' of the process or processes being monitored and controlled; and a navigation tool that provides fast access to different process graphics in the process or processes thus monitored and controlled. The navigation tool may be inspected by an operator without the operator leaving the context of the currently open process graphic by closing or covering the process graphic with a new process graphic or other display. The navigation tool may be activated by the operator to open a process graphic that is in a hierarchical relationship with the currently open process graphic, also without leaving the visual context of the currently open process graphic. In this way the context of the process graphics in the process is identified and maintained, thus facilitating the tasks of the operator.

Process graphics are the mainstay of most industrial control systems. All of the control objects, represented by software objects, are placed in a context of one or more process graphics. There are different ways to group these process graphics, preferably based on a logical structure and/or relationship(s) between them. As an example, there can be a set of top-level graphics that act as overview graphics to the process graphics. One level down the process graphics that show the functionality for one area of this top-level are arranged. Subsequently, at a lower level than that, there are the detail graphics that show details for one or a few of the components in the process graphics.

In a preferred embodiment the methods of the invention may be carried out by a computing device comprising one or more microprocessor units or computers. The computing device(s) comprise memory means for storing one or more computer programs for carrying out the improved methods for navigation among process graphics in a control system. Preferably such computer programs contain instructions for the processor to perform the method as mentioned above and described in more detail below. The instructions may be stored on a non-transitory, computer readable medium. The instructions may also be stored in volatile computer readable memory.

BRIEF DESCRIPTION OF THE DRAWINGS

Embodiments of the invention will now be described, by way of example only, with particular reference to the accompanying drawings in which.

DETAILED DESCRIPTION OF THE INVENTION

Figure 1:
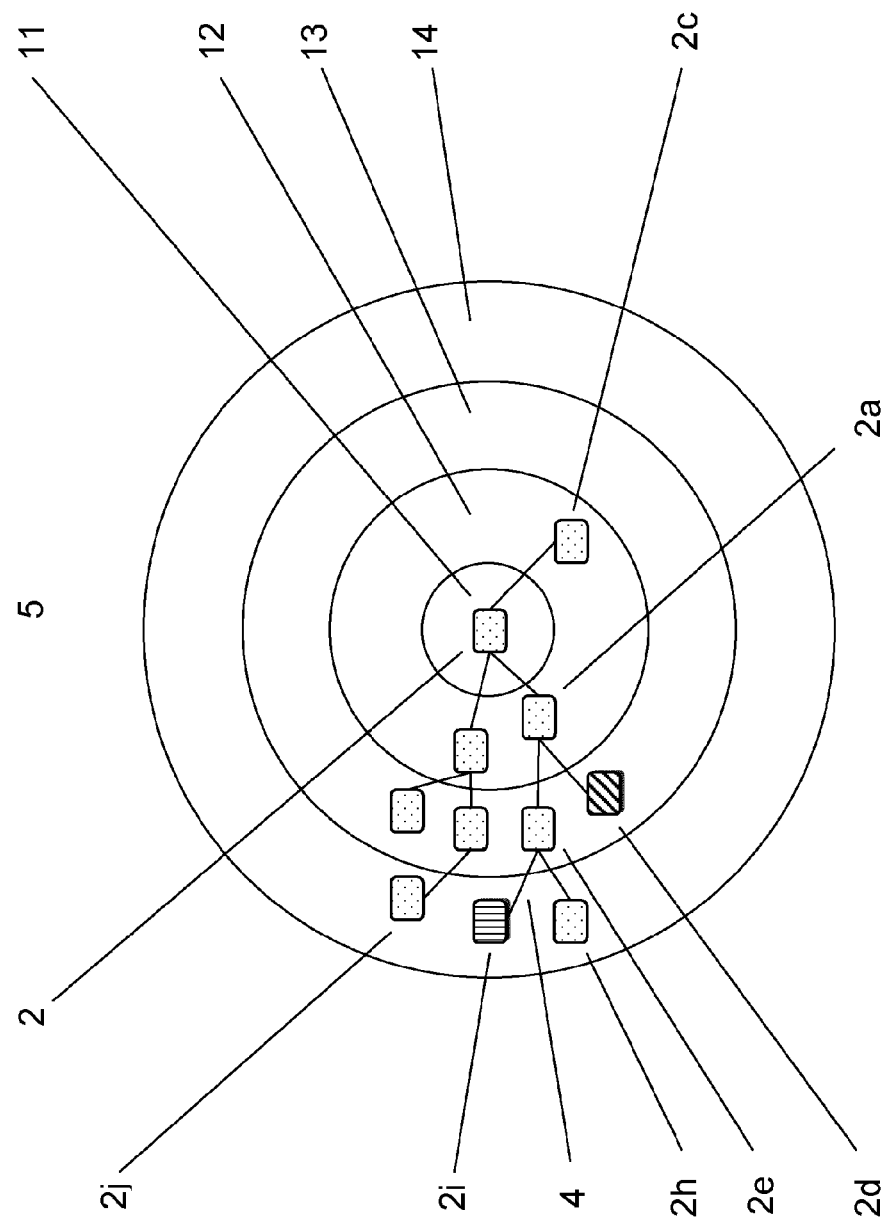
FIG. 1 shows a schematic representations of a navigation tool for superposition on top of a display of a human machine interface for monitoring and controlling a process, the example showing a map comprising nodes, each node representing a process graphic in the control system, and showing a hierarchical relationship between the process graphics by means of the spatial arrangement of the nodes according to an embodiment of the invention.

As previously stated an industrial control system normally includes a great number of process graphics used by an operator to monitor and control a process. The basic form of the invention is shown in FIG. 1. The figure shows a map 5 on which a number of nodes 2, 2a-2j are arranged together. Each node is arranged at one of a plurality of finite distances from the centre node. Thus nodes 2j, 2i, 2h are all arranged at the same finite distance from the centre, but at different angles when considered from a radial description. The above 3 nodes are all arranged at the same hierarchical level, shown as a fourth level 14. Two other nodes 2a and 2c are each arranged at the same distance from the centre, which is a shorter distance than nodes 2j, 2i, 2h are from the centre; and these two nodes are shown as being on third level 12. Thus in one embodiment the nodes may be shown and displayed with a number of lines marking out separate parts of the area of the map in the form of a number of concentric circles that visually indicate different levels in a hierarchy of process graphics.

Each node represents one of the process graphics in the control system. The concentric circles define separate parts of the area of the map, each concentric circle being drawn at a finite distance from the centre, the distances therewith defining a number of levels. These levels are indicated as an exemplary form on the map as a top level inside circle 11, a second level 12, a third level 13, a fourth level 14. The nodes are arranged distributed across the separate areas of the map 5 according to a hierarchical relationship between the nodes. In other words, each node on the map is arranged at one of a number of finite distances from the centre of the map according to a position in the hierarchical relationship between the two or more said process graphics.

Thus node 2, shown on the top level 11 is arranged on a higher level than node 2c which is on the second level 12, in the hierarchy of 2 and 2c. Similarly, node 2 is arranged on a higher level 11 than node 2a on the second level 12 which is in turn on a higher level than node 2e on the third level 13, which is in turn arranged above nodes such as 2h, 2i on the fourth level. The different levels are derived from the hierarchy between different process graphics.

The process graphic represented by node 2 is a top level process graphic, and process graphics at a lower level in the hierarchy such as level 3 are represented by nodes such as 2e placed on the third level. The hierarchical relationship between nodes is shown by a line drawn between them, such as the line 4 joining node 2e to node 2i. One node 2d is shown with a predetermined visual indicator, such as a red colour, or a blink, or other visual attribute to indicate on the map that the process graphic it represents contains a predetermined state. Typically this predetermined state is configured to show an alarm state, or an alarm state acknowledged but not cancelled or other system state of interest.

Figure 2:
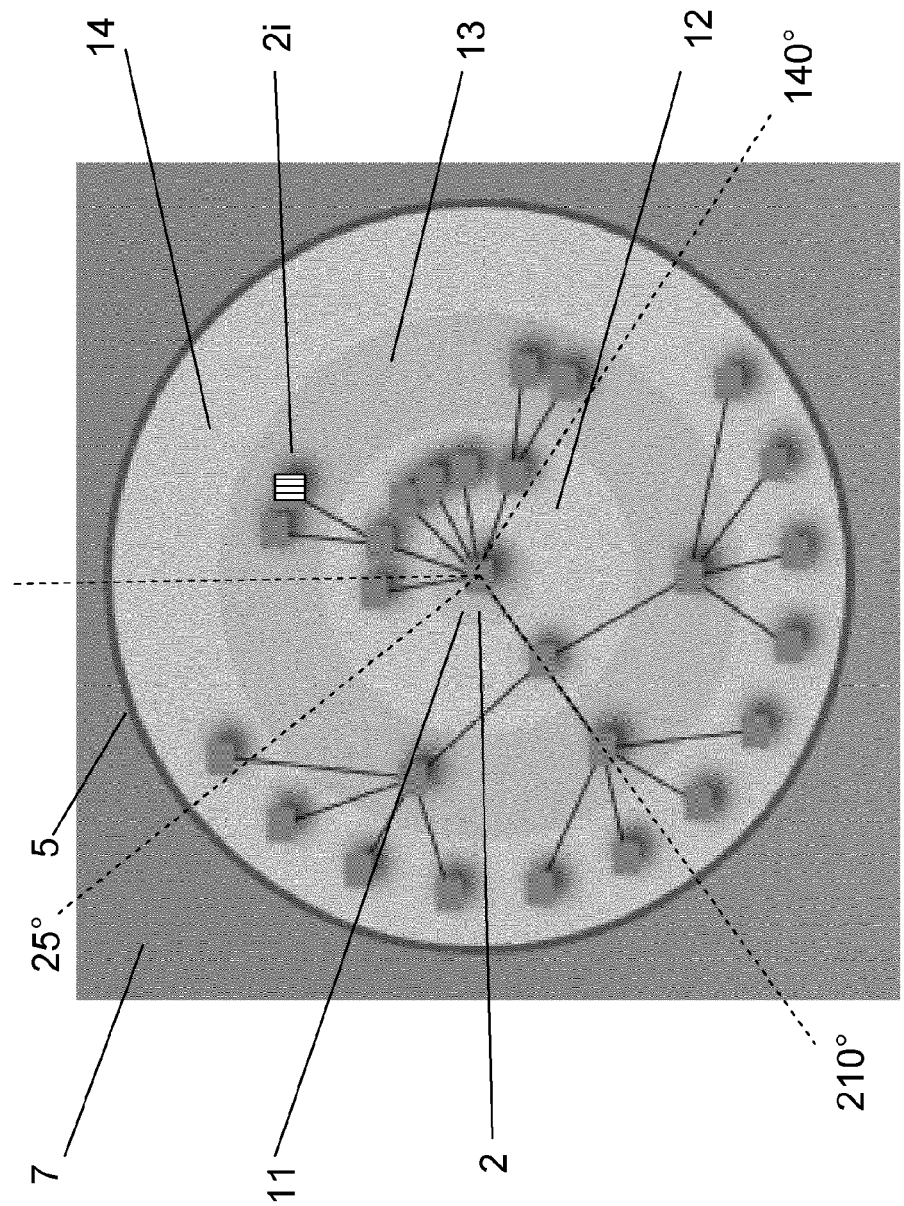
FIG. 2 is a schematic representation of the navigation tool of FIG. 1 which shows an example of a plurality of groups of nodes, where in each group the nodes are arranged in separate parts of the map to show a hierarchical relationship between the nodes according to an embodiment of the invention.

In FIG. 1 another node, 2i, is also shown marked with a different visual indicator than that shown for node 2d. Node 2i is arranged with a colour or illumination density or blink, or combination of those attributes to indicate visually that it is node 2i that represents the process graphic that is currently open and displayed. FIG. 2 shows the navigation map 5 superimposed on a process graphic, indicated by the coloured background 7. Each of the nodes are arranged at one of four finite distances from the centre because each of nodes is arranged in a group according to a hierarchical relationship between the underlying process graphics. A number of nodes are shown, each arranged on one of the top level 11, second level 12, third level 13 or further level 14 in a hierarchical relationships with at least one other node. There may be a greater number of levels than the four levels described here; or there may be a lesser number of levels in the hierarchical relationships. One of the nodes, node 2i, is shown marked with a visual indicator which is used to identify that it is the node that the currently open process graphic is represented by.

Nodes that are not arranged with a visual indicator, nodes representing process graphics other than the currently open process graphic which also do not include a predetermined state such as an alarm, these nodes are shown graphically as a relatively neutrally shaped point. This may be represented by a plain circle or square in a neutral colour or even a dot or point object, for example in black. In FIG. 1 the nodes are drawn as rectangular shapes with rounded corners, however this is only an exemplary example, and the nodes may be represented by any relatively neutral shape. The representation of the map 5 may include circular forms, as in FIG. 1 (concentric circular lines) or in FIG. 2 (concentric circular areas) but may also or instead be arranged drawn on a plain background or on a plain background with radial lines, and so on.

Figure 3:
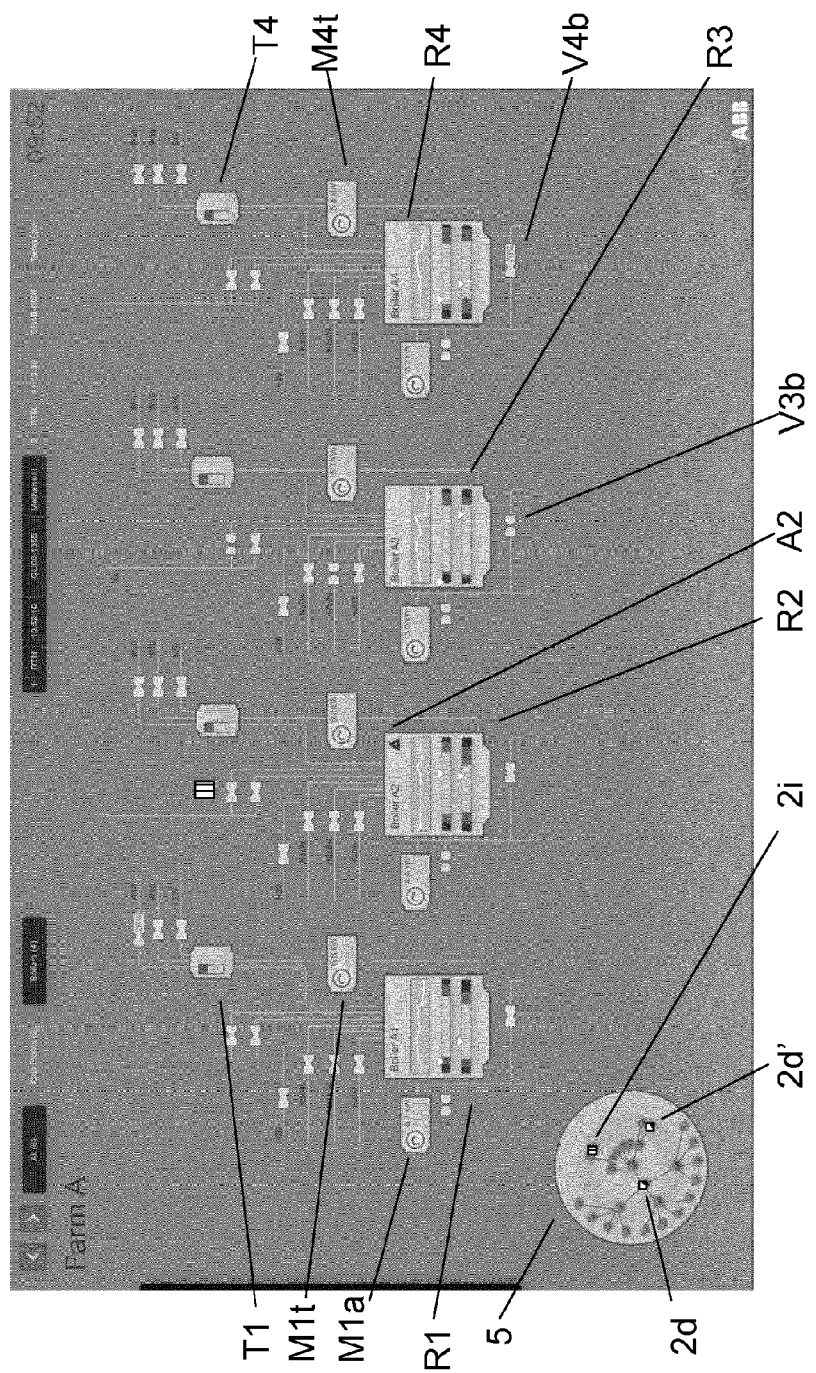
FIG. 3 shows a schematic representation of the navigation tool of FIG. 1 superimposed on a process graphic that one of the nodes represents, wherein the node representing the displayed process graphic is arranged on the map with a visual indicator to signify that it is the node represents the process graphic currently displayed, according to another embodiment of the invention.

FIG. 3 shows the navigation tool of FIG. 1, the map 5, arranged superimposed on the currently open process graphic 8, which is an exemplary process graphic. Typically such a process graphic 8 is viewed and/or manipulated by an operator using a workstation of a process control system. An operator workstation, a process and a process control systems are described in more detail, below, in relation to FIGS. 4 and 5. In the drawing in FIG. 3 the separate parts of the area of the map 5 are shown as concentric circles, although the different levels 11-14 may also be represented in a radial fashion as the nodes are placed at one of a finite number of finite distances from the centre. This process graphic 8 is an example of many such process graphics that may be displayed on a workstation of the control system. The figure shows a process graphic 8 for a process or part process. The process graphics in the control system are used for controlling and/or monitoring real world objects in the process controlled by the control system. Software objects representing the equipment and processes are displayed in process graphics by the control system. These software objects are usually arranged as a number of hierarchical groups each one representing a process or part-process.

Thus the process graphic 8 shows software objects that are software representations of exemplary equipment in the form of four reactor vessels R1-R4, arranged connected by various arrangements of process piping, and a number of valves of which only two valves, closed valve V3b, open valve V4b are shown with reference numbers in order to minimize visual clutter in the diagram. Each software object in the process control system is linked to data and information about the real world object the software object represents. Thus selecting or activating a software object on a process graphic 8 activates a link to the information in the control system about that particular real world object. The process diagram also shows a number of motors, such as M1a, M1t and M4t arranged in the process to drive pumps or other machinery. The process diagram also shows four other vessels, including tanks T4 and T1. A navigation map 5 is shown superimposed on a part of the currently open process graphic 8.

One of the nodes of the map, in this case node 2i, is shown marked with a visual indication to indicate that it represents the currently open process graphic, in this example process graphic 8. By means of this visual indicator, the operator can see in which position in the overall process flow the currently displayed process graphic is located. In other words by means of the visual indicator the operator can see where the currently open process graphic is placed in respect of the hierarchy of process graphics. The visual indicator displays very simply the technical context of the currently displayed process graphic, without hiding any information on the already-open process graphic 8. The operator at the workstation can see which process the currently displayed process graphic is a downstream process of, and of which process or part process the currently displayed process graphic is an upstream process of.

One advantage of the map 5 is that it provides a visualization of all the process graphics contained in the process control system, and visually indicates the currently selected process graphic in the hierarchy of process graphic displays. This aids understanding and makes it easier for an operator to access information about upstream or downstream processes or events linked to those processes. It is an advantage of the navigation tool that it provides an operator with an overview of a complete process at a glance, and without moving away from, covering over or otherwise losing sight of the information on the currently open process graphic.

In addition, one or more nodes may be marked with a visual indicator to signal that the process graphic the node represents contains a process area, an equipment or an object that has a particular or predetermined state, such as an alarm state, because the node is so marked. Thus the map or overview may also indicate, by means of nodes that show a visual indicator, process areas or objects that have a predetermined state of interest such as an alarm, or an alarm that has not been acknowledged by an operator, or other state. Thus in FIG. 3 there are two nodes $2d$ and $2d'$ that are indicated with a prominent visual indicator to signify a predetermined state which may be a state such as a 'high priority alarm not acknowledged'.

The benefits of this visualization and navigation tool include that an operator may be trained and learn how to work as an operator more quickly, with help of the context information provided by hierarchical relationships diagrammed by the navigation tool. In many traditional control systems there is often no sense of context i.e., when the operator looks at one process graphic on a workstation display, it is not possible for the operator to know where in the hierarchy of process displays the user currently is. Without long and detailed training and much on-the-job experience it is very hard for an operator to know where, to which process graphic, the operator can go to from the current process graphic display and to find information about a state or an event in another part of the process.

The second advantage is that the map 5 provides a fast navigation tool in the process control system. As a navigation tool the functioning is very simple and intuitive. Simply by selecting and activating a node, a link is activated and the process graphic represented by the node just activated is opened and displayed. An operator may for example look at the map 5, left-click or double click on another node using a computer mouse or other input device and a second process graphic represented by the other node so activated is opened in the display on the workstation. In FIG. 1 that would be to click on any of nodes 2, 2a-h, 2j, but not 2i, the node representing the currently open process graphic 8. The operator maintains knowledge of at which stage in the process, as displayed by the currently open process graphic, the operator is currently looking at. The operator knows from which process graphic he or she has just moved. By using the map 5, an operator can quickly navigate from one process graphic to another in a logical manner while still keeping an overview of the process in sight. The overview provided by the map is always present, on each process graphic when displayed. The map, as a small graphic, can typically be placed on, or moved simply by dragging to, a place on the process graphic where it does not obscure any information.

An operator who is an experienced operator may prefer to look at the map 5, and press a key on a keyboard, or use a keyboard combination to open a selected node. In addition, keystrokes or key combinations may be arranged to move 'up' to the next highest level in the hierarchy, or 'down' to the nearest process graphic lower in the hierarchy. Similarly, selections of keystrokes or keyboard combinations or function key combinations may be configured so they can be used to navigate from the presently open process graphic to a subsequent process graphic, or to a previous process graphic; or to the process graphic of a parallel process.

When a node on the map is activated by clicking a button of a computer mouse, or using another data input device such as a user input device (31 in FIG. 5), the process graphic that it represents opens and displays in the interface or in a window of the interface. This is done by means of an executable function associated with the node in the graphic user interface of the workstation. The executable function may be implemented on the interface in a number of ways.

When an operator activates another node to open another process graphic the navigation map is re-drawn at the same time so that the newly activated node that represents the newly opened process graphic is shown marked on the navigation map 5 as the node representing the currently open process graphic.

As mentioned previously, a visual indicator, is used to mark a node ($2d$, $2d'$) to indicate that the process graphic the node represents contains a process section, an equipment or an object that has a predetermined state of interest such as an alarm, or an alarm that has not been acknowledged by an operator. Such a predetermined state is typically some sort of alarm or an event. Other states may be any such as: normal, high priority alarm, alarm acknowledged and not cancelled, alarm within a predetermined time period, fire or gas alarm. Optionally other sets of states may be indicated by means of configuring the nodes to show predetermined system states. Such optional states may include any from the group of: startup, normal operation, shutdown, emergency shutdown. Indicators for selected states may be arranged to be visually switched on or off, such that are only displayed on request, while other predetermined states may be configured to be always shown, or always shown when particular conditions are met.

Thus referring to FIG. 3, node $2i$ may be the node that represents the currently open process graphic 8. The visual indicator marking the node $2i$ of the currently open process graphic 8 may be for example be a highlight with a different colour or light intensity, an accent colour, a contrast colour, a different outline or background or a dynamic indicator such as a change in light intensity, a blink and so on. One or more other nodes ($2d$, $2d'$) may also be marked with a different visual indicator to indicate a state of the process in the process graphic such a node represents. For example a node representing a process graphic with an alarm state may be coloured red, and so on.

In a preferred embodiment any node with a visual indicator may be arranged to show, for example upon activation such as on hovering, on mouse roll-over or as a tool tip, a label appearing on the graphic user interface summarizing in words or symbols the unique alarm or other event that is indicated by the visual indicator on that particular node. This may be implemented by initiating a live data subscription to a tag, or other control object identifier in the control system, when a mouse roll-over is detected on or near the node so indicated. In another embodiment, nodes without any state indicator other than normal may be arranged to display, when a mouse roll-over is detected, the tag or label or an icon for the process graphic represented by the node.

Figure 4:
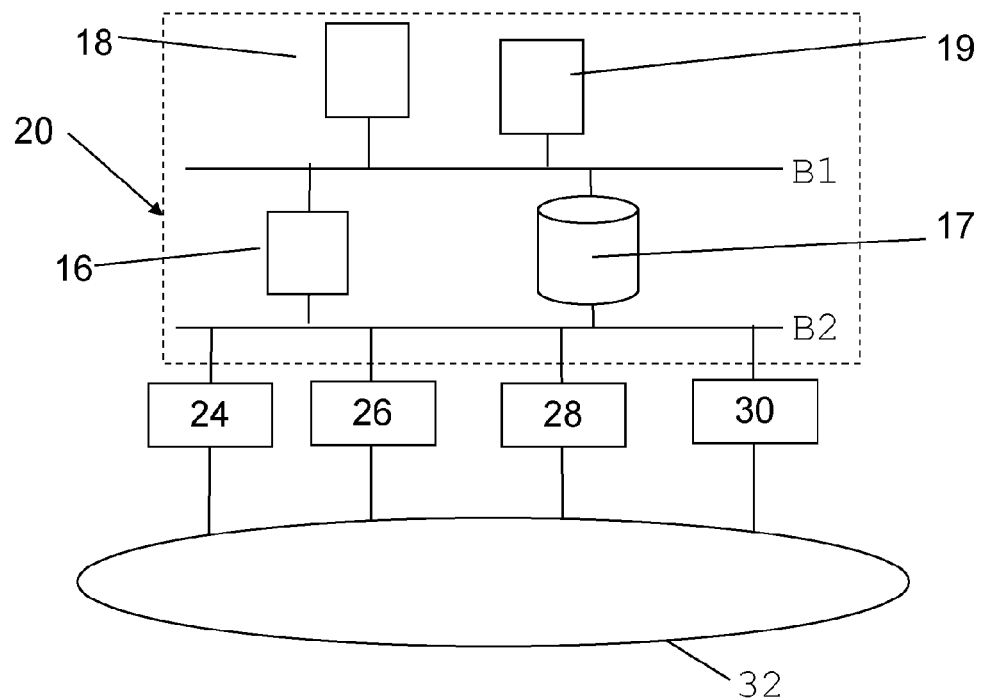
FIGS. 4 and 5 show a schematic representation of a process control system and a process with which the navigation tool of FIG. 1 may be used for monitoring and controlling an industrial process.

FIG. 4 schematically shows a control system 20 for a process 32, i.e. a process control system. The process 32 may be an industrial process and may furthermore be any of a number of different types of processes such as a pulp and paper production process, an oil refining process, a mining process, an electric power transmission process or an electric power distribution process. The control system 20 may for instance be an object-based computerised system for controlling the process 32, a system such as the 800xA system supplied by ABB.

In FIG. 4 the process control system 20 includes a number of operator terminals or workstations 18 and 19 connected to a first bus B1. There is furthermore a second bus B2 and between the first and second busses there are connected a server 16 providing control and monitoring of the process 32 and a database 17 where data, like historical data relating to control and monitoring of the process 32 is stored. To the second bus B2 there are furthermore connected process interface units 24, 26, 28 and 30 for providing control of the process and for receiving measurement data from the process 32. In the figure there are provided four such process interface units 24, 26, 28, 30 that interface the process 32. It should however be realized that there may be more or fewer of each of these units. It should here also be realized that some of these may only be provided for control, some only for measurements and some for both control and measurements. Such units are thus all involved in controlling the process 32 and in doing this also involved in measuring physical properties related to the process. The measured properties may here be properties of the process itself such as a voltage of or current running in a power line or the pulp temperature of a pulp and paper process. However the measured properties may also be properties of an interface unit, like for instance the temperature in a reactor such as reactors R1-R4, of a transformer, a revolutions-per-minute (rpm) speed of a motor such as motors M1$a$, M4$t$. The process interface units 24, 26, 28, 30 therefore also provide information on their properties or status.

Figure 5:
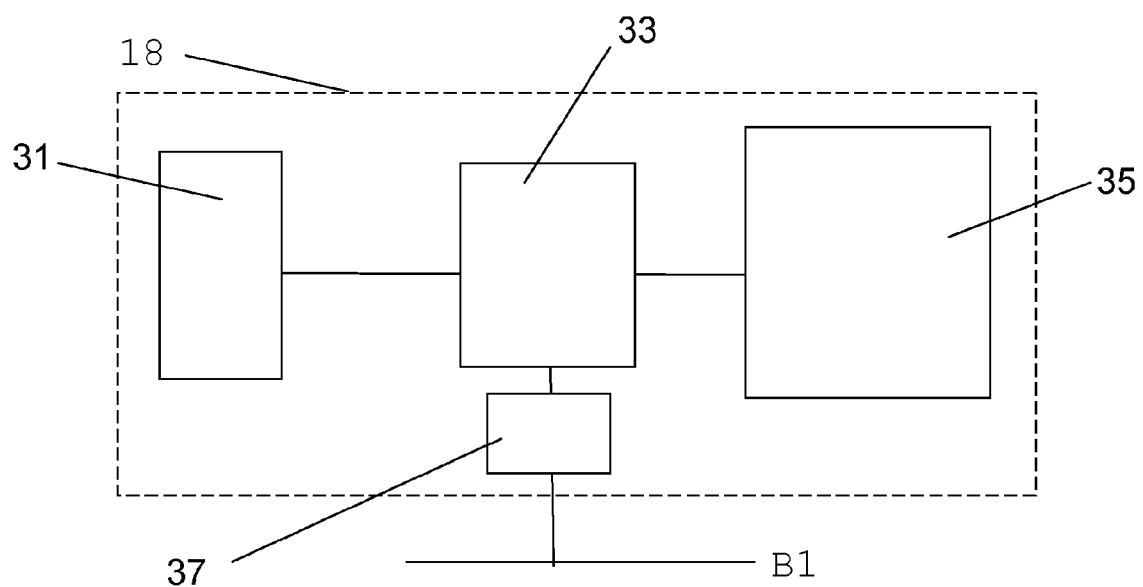

An operator workstation 22, shown in FIG. 5, in a process control system 20 includes a user input unit 31, a display unit 35, a display control unit 30 and an interface 36 for communicating with the other parts of the process control system 20 via the first bus B1. An operator workstation 18 or 19 provides a graphical user interface for an operator of the system, with which process graphics, the map 5 and other human machine interface screens for monitoring or controlling a process may be displayed. The control unit 30 may be a processor with an associated program memory including program code for performing the functionality of the present invention. The display unit 35 may be any suitable display unit, such as a liquid crystal display, plasma device, LED device or similar. The user input unit 32 is a unit through which a user of the operator workstation 22, i.e. an operator, may enter data. As such it may be a keyboard, a keypad or a mouse. It may also be combined with the display unit in order to together form a touch screen.

The operator workstation 22 may also include other user interfaces such as a speaker or a microphone in order to present and receive data to and from one or more users of the operator workstation 22 in other ways than through the display unit. The unit may for example be arranged with sensors and software suitable for receiving gesture-based commands, as well or instead of commands by means of touching or sweeping fingers on a touch screen or input via a computer mouse and so on.

Data from the various process interfaces can be collected and stored in a history data base 17 as well as presented in real-time to an operator via the display unit 35. The operator workstation 22 in the process control system 20 may present data regarding the process in a number of different ways. Primarily process information is presented in a series of process graphics, as described previously. It may present the process through a number of interconnected process control units, which process control units may include process interface units. However they may also include other units where the process is carried out but no measurements are being made or no control is carried out. Along with these units the operator workstation or terminal may furthermore display data relating to the process as well as to the process control units, such data may be measurement data of a physical property of the process and/or of process interface units. The data may also include data of a physical property that has been derived from a measured physical property. The data may furthermore include status data of various units in the system.

The methods of the invention may, as described herein, be carried out by means of one or more computer programs comprising computer program code or software portions running on a computer or a processor. The microprocessor (or processors) comprise(s) a central processing unit CPU performing the steps of the method according to one or more facets of the invention. This is performed with the aid of one or more said computer programs, such as, which are stored at least in part in memory and as such accessible by the one or more processors. It is to be understood that said computer programs may also be run on one or more general purpose industrial microprocessors or computers instead of one or more specially adapted computers or processors.

Figure 6:
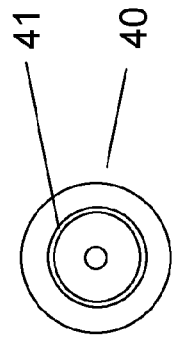
FIG. 6 schematically shows a data carrier carrying program code for implementing the navigation tool of FIG. 1 on a display control unit of an operator workstation.

The computer program comprises computer program code elements or software code portions that make the computer perform the method using equations, algorithms, data, stored values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, or a non-transitory computer readable medium such as a CD (compact disc) or a DVD (digital versatile disc), stored on a hard disk, magneto-optical memory storage means, in volatile memory, in flash memory, as firmware, stored on a data server or on one or more arrays of data servers. One such data carrier 40 in the form of a CD ROM disk with a computer program 41 carrying such computer program code recorded on it is schematically shown in FIG. 6.

The skilled person in the art realizes that the present invention by no means is limited to the examples described above. On the contrary, many modifications and variations are possible within the scope of the appended claims.

What is claimed is:

1. A method for providing a navigation tool for a user interface for an industrial control system comprising a computer and a display device or workstation, said system further arranged with a plurality of process graphics comprising one or more software objects for controlling and/or monitoring real world objects in a process controlled by said control system, which said software objects are arranged in a plurality of hierarchical groups each one representing a process, part-process or an equipment in which materials are moved and/or processed in a predetermined order from one process state to another, which process or equipment is displayed in one of a plurality of said process graphics on a workstation, characterised by automatically generating a graphic image in the form of a map showing the plurality of process graphics arranged symbolically as a plurality of nodes, where each node is spatially arranged in a separate part of the map according to a hierarchical relationship between the process graphics, and superimposing the graphic image of the map on top of a currently open said process graphic displayed on the workstation.

2. The method according to claim 1, characterised by automatically indicating with a visual indicator the one node of the plurality of nodes on the map that represents the said process graphic that is currently displayed.

3. The method according to claim 1, characterised by opening, upon activation of a node in the map by means of an executable function associated with the node, the process graphic represented by the node so activated and displaying it on the user interface or in a window on the interface.

4. The method according to claim 1, characterised by opening, upon activation of a node in the map by means of an executable function associated with the node, the process graphic represented by the node so activated, and re-drawing the map such that the node representing the presently open process graphic is shown with a different visual appearance from the remainder of the plurality of nodes to indicate on the map that it is the node that represents the said process graphic that is currently displayed.

5. The method according to claim 1, characterised by arranging each node on the map according to a position of the process graphic it represents in the hierarchical relationship between two or more processes, part-processes or equipment represented on a process graphic.

6. The method according to claim 1, characterised by arranging each node on the map at one of a plurality of finite distances from the centre of the map according to a position in the hierarchical relationship between the two or more said process graphics.

7. The method according to claim 1, characterised by automatically retrieving one or more states from a process graphic containing a process area, object or equipment that has a predetermined state, and arranging the node representing it on the map to show or indicate, in a static or dynamic way, the predetermined one or more states which is or are equal to any from the group of: normal, alarm, high priority alarm, alarm acknowledged and not cancelled, alarm within a predetermined time period.

8. The method according to claim 1, characterised by updating a status of nodes on a map to show which, if any, of the process graphics represented by the nodes contains a process area or object or equipment that has a predetermined state within a predetermined time of the update, or, by updating on receipt of an operator request to show on the map any node including the above named, predetermined state.

9. A computer program product encoded on a non-transitory computer readable medium comprising computer program code configured to, when said program code is loaded into a workstation provided in a process control system, carry out the steps of a method for providing a navigation tool for a user interface for an industrial control system comprising a computer and a display device or workstation, said system further arranged with a plurality of process graphics comprising one or more software objects for controlling and/or monitoring real world objects in a process controlled by said control system, which said software objects are arranged in a plurality of hierarchical groups each one representing a process, part-process or an equipment in which materials are moved and/or processed in a predetermined order from one process state to another, which process or equipment is displayed in one of a plurality of said process graphics on a workstation, characterised by automatically generating a graphic image in the form of a map showing the plurality of process graphics arranged symbolically as a plurality of nodes, where each node is spatially arranged in a separate part of the map according to a hierarchical relationship between the process graphics, and superimposing the graphic image of the map on too of a currently open said process graphic displayed on the workstation.

10. A workstation of an industrial control system comprising a computer and a display device, said workstation being arranged with a user interface, said system further arranged with a plurality of process graphics comprising one or more software objects for controlling and/or monitoring real world objects in a process controlled by said control system, which said software objects are arranged in a plurality of hierarchical groups each one representing a process, part-process or an equipment in which materials are moved and/or processed in a predetermined order from one process state to another, which process or equipment is displayed in one of a plurality of said process graphics on a workstation, characterised in that the workstation further comprises an interface arranged for receiving measurement data of one or more physical properties relating to a process being controlled by the process control system, a display unit for displaying physical properties of the process control system to a system operator, and a display control unit configured to display a graphic image in the form of a map showing the plurality of process graphics arranged symbolically as a plurality of nodes, where each node is spatially arranged in a separate part of the map according to a hierarchical relationship between the process graphics, and where the graphic image of the map is superimposed on top of a currently open said process graphic displayed on the workstation.

11. The workstation according to claim 10, characterised in that the workstation is configured to display the map with a visual indicator automatically indicating the one node of the plurality of nodes that represents the said process graphic that is currently open and displayed on the workstation, or in a window on the workstation.

12. The workstation according to claim 10, characterised in that the workstation is configured to display the nodes in the map arranged with an executable function such that, upon activation of a node in the map, the process graphic represented by the node so activated is opened and displayed on the user interface or in a window on the interface.

13. The workstation according to claim 10, characterised in that the workstation is configured to display the map as a result of automatically retrieving one or more states from a process graphic containing a process area, object or equipment that has a predetermined state, and to arrange the node representing the process graphic on the map to show or indicate, in a static or dynamic way, the predetermined state or states existing in the process graphic.

14. The workstation according to claim 10, characterised in that the workstation is configured to display each node on the map arranged at one of a plurality of finite distances from the centre of the map according to a position in the hierarchical relationship between the two or more said process graphics.

15. The workstation according to claim 10, characterised in that the workstation is configured to display a node when one or more states are automatically retrieved from a process graphic and contain a process area, object or equipment that has a predetermined state, wherein the node is arranged to show or indicate, in a static or dynamic way, a predetermined state or states equal to any from the group of: normal, alarm, high priority alarm, alarm acknowledged and not cancelled, alarm within a predetermined time period.

16. An industrial control system comprising a workstation, said workstation being arranged with a user interface, said system further arranged with a plurality of process graphics comprising one or more software objects for controlling and/or monitoring real world objects in a process controlled by said control system, characterized by a workstation according to claim 10.

* * * * *